(12) United States Patent
Takahashi (10) Patent No.: US 10,642,450 B2
(45) Date of Patent: May 5, 2020

(54) INFORMATION PROCESSING APPARATUS

(71) Applicant: Konica Minolta, Inc., Tokyo (JP)

(72) Inventor: Masao Takahashi, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 110 days.

(21) Appl. No.: 15/355,669

(22) Filed: Nov. 18, 2016

(65) Prior Publication Data

US 2017/0147169 A1 May 25, 2017

(30) Foreign Application Priority Data

Nov. 19, 2015 (JP) .................................. 2015-226527

(51) Int. Cl.
  *G06F 3/00* (2006.01)
  *G06F 3/0482* (2013.01)
  *H04N 1/00* (2006.01)
  *H04N 1/32* (2006.01)

(52) U.S. Cl.
  CPC ....... *G06F 3/0482* (2013.01); *H04N 1/00029* (2013.01); *H04N 1/00344* (2013.01); *H04N 1/00411* (2013.01); *H04N 1/32101* (2013.01); *H04N 2201/3202* (2013.01)

(58) Field of Classification Search
  CPC ................................. H04N 1/0029; H04N 1/00344; G06F 3/0482; G06F 21/31; G06F 21/316; G06F 21/32; G06F 21/6218; G06F 21/80; G06F 2221/2133; G06F 3/0418; G06F 3/04845; G06F 3/04886
  See application file for complete search history.

(56) References Cited

U.S. PATENT DOCUMENTS

| 4,866,712 A * | 9/1989 | Chao .................... G06F 11/076 714/2 |
| 5,315,502 A * | 5/1994 | Koyama ............ G05B 23/0229 700/79 |

(Continued)

FOREIGN PATENT DOCUMENTS

| JP | S62-278646 A | 12/1987 |
| JP | H01-207837 A | 8/1989 |

(Continued)

OTHER PUBLICATIONS

Masahi, Komoda; "Technique for shutting down with just a keyboard without using a mouse"; published by X-Knowledge Co., Ltd.; May 2000; vol. 2 No. 5; p. 71.

(Continued)

*Primary Examiner* — Di Xiao
(74) *Attorney, Agent, or Firm* — BakerHostetler (57) ABSTRACT

An information processing apparatus includes: a user interface unit including a display unit and an input unit; and a processor outputting, by an operation of a user, a diagnostic/recovery menu in which a processing detail of each of a plurality of diagnostic/recovery processing is associated with importance of the processing detail on the display unit as well as determining a range and a type of information to be acquired for a trouble analysis on the basis of diagnostic/recovery processing selected by the user on the diagnostic/recovery menu and storing the determined information into a storage unit along with the importance.

20 Claims, 4 Drawing Sheets

(56) References Cited

U.S. PATENT DOCUMENTS

| | | | | |
|---|---|---|---|---|
| 5,859,956 | A * | 1/1999 | Sugiyama | G06F 3/1294 358/1.13 |
| 9,032,259 | B1 * | 5/2015 | Hood | G06F 11/3692 714/57 |
| 2003/0110412 | A1 * | 6/2003 | Neville | G03B 15/006 714/25 |
| 2004/0201867 | A1 * | 10/2004 | Katano | G06F 8/65 358/1.15 |
| 2010/0238484 | A1 * | 9/2010 | Komine | G06F 3/1204 358/1.15 |
| 2011/0194143 | A1 * | 8/2011 | Yamaguchi | G06F 11/0733 358/1.15 |

FOREIGN PATENT DOCUMENTS

| | | |
|---|---|---|
| JP | H07-162420 A | 6/1995 |
| JP | H09-006652 A | 1/1997 |
| JP | 2004-013714 A | 1/2004 |
| JP | 2006-099745 A | 4/2006 |
| JP | 2007-062288 A | 3/2007 |
| JP | 2009-003557 A | 1/2009 |
| JP | 2009-151680 A | 7/2009 |
| JP | 2009-528206 A | 8/2009 |
| JP | 2009-230301 A | 10/2009 |
| JP | 2015-049792 A | 3/2015 |
| WO | 2007-098781 A1 | 9/2007 |

OTHER PUBLICATIONS

Japan Patent Application No. 2015-226527; Notice of Reasons for Rejection; dated Dec. 27, 2017; 17 pages.

Masahi, Komoda; "Technique for shutting down . . . ", Cite No. 11, See JP Patent Application No. 2015-226527; Notice of Reasons For Rejection; dated Dec. 27, 2017; see p. 9—cite No. 12.

* cited by examiner

INFORMATION PROCESSING APPARATUS

CROSS-REFERENCE TO RELATED APPLICATIONS

This U.S. patent application is entitled to and claims the benefit of Japanese Patent Application No. 2015-226527, filed on Nov. 19, 2015, the entire contents of which, including the description, claims, drawings, and abstract are hereby incorporated by reference in its entirety herein.

BACKGROUND OF THE INVENTION

Field of the Invention

The present invention relates to an information processing apparatus capable of executing diagnostic processing and recovery processing.

Description of the Related Art

JP 2004-13714 A discloses a communication terminal device including: an abnormality detection processing unit that detects the occurrence of an abnormality while a computer program is executed by a processor in the communication terminal device; a debug information storage processing unit that stores debug information of the computer program in a debug information storage when the abnormality is detected; a restart processing unit that restarts the processor with a failure flag being set after the debug information is stored; and a debug information transmission processing unit that transmits the debug information stored in the debug information storage on the basis of the failure flag at startup of the processor.

JP 2009-528206 A discloses a method of resolving a trouble with a motor vehicle by radio, where information can be transmitted to a service facility upon checking whether or not a user such as a driver presses a button and calls for help such as help with a trouble.

When one receives an inquiry about a trouble with a device at a customer's site but cannot easily determine details of the trouble from past cases, a service person providing service at the customer's site sometimes cannot immediately determine the cause of the trouble but performs replacement of a board without making clear the causality of the trouble.

It is required to replicate a symptom in order to analyze an unknown trouble, in which case a log at the time of the occurrence of the trouble becomes useful. In JP 2004-13714 A, the device can be restarted by collecting a log when the abnormality is successfully detected. However, information cannot be collected in case of a trouble with the abnormality detection unit itself or a trouble at a level not determined as abnormal by the abnormality detection unit even when the user experiences some kind of abnormality.

There is also a limit to the storage area used to store the log, so that it is impossible to record all states over a long period of time. Accordingly, one has no choice but to depend on the most recent log acquisition in some cases.

However, the user in most cases gives higher priority to continued use of the device by turning off and on a power supply and attempting a restart at the occurrence of the trouble, in which case log information at the occurrence of the trouble is lost since the power supply is turned off once. Moreover, the user is to bear the burden when requested to acquire the log because the device cannot be used for an extended period of time against the will of the user while acquiring a memory dump, a detailed log or the like.

Furthermore, according to JP 2004-13714 A, the log can be acquired when the abnormality is successfully detected, but a method of recovery cannot be presented to the user, who thus cannot perform recovery from the trouble by a proper procedure.

According to JP 2009-528206 A as well, while the user can receive support by transmitting information to the service facility at the point he experiences the trouble, a method of recovery cannot be presented to the user, who thus cannot perform recovery from the trouble by a proper procedure. Moreover, the service facility is notified every time the trouble occurs regardless of the degree thereof, so that a communication is established even in case of a minor trouble that does not need to be notified.

SUMMARY OF THE INVENTION

Technical Problem

The present invention has been made in order to solve the aforementioned problems, and an object thereof is to provide an information processing apparatus capable of executing diagnostic processing and recovery processing according to a degree of a trouble.

To achieve the abovementioned object, according to one aspect, referred to as Item 1, an information processing apparatus reflecting one aspect of the present invention comprises: a user interface unit configured to include a display unit and an input unit; and a processor configured to output, by an operation of a user, a diagnostic/recovery menu in which a processing detail of each of a plurality of diagnostic/recovery processing is associated with importance of the processing detail on the display unit as well as determine a range and a type of information to be acquired for a trouble analysis on the basis of diagnostic/recovery processing selected by the user on the diagnostic/recovery menu and store the determined information into a storage unit along with the importance.

Another aspect, referred to as Item 2, is the information processing apparatus of Item 1, wherein the processor preferably updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

Another aspect, referred to as Item 3, is the information processing apparatus of Item 1, wherein the processor preferably determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

Another aspect, referred to as Item 4, is the information processing apparatus of Item 1, wherein the processor preferably compares a level of importance selected by the user this time with importance of previous diagnostic/recovery processing when the importance specified by the diagnostic/recovery processing selected by the user on the diagnostic/ recovery menu is determined lower than a threshold on the basis of the importance, and, when the importance is higher than the previous time, updates trouble count information that counts the occurrence of a trouble and transmits information to an external management system.

Another aspect, referred to as Item 5, is the information processing apparatus of Item 1, wherein the processor preferably compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

Another aspect, referred to as Item 6, is the information processing apparatus of Item 1, wherein the processor preferably determines an operation of the input unit to execute specific diagnostic/recovery processing upon determining that the diagnostic/recovery menu cannot be output on the display unit due to a problem with the user interface unit.

Another aspect, referred to as Item 7, is the information processing apparatus of Item 1, wherein the processor preferably allows for selection of diagnostic/recovery processing that executes initialization and restoration after the initialization on the diagnostic/recovery menu.

Another aspect, referred to as Item 8, is the information processing apparatus of Item 1, wherein the processor preferably determines priority of information that is kept stored on the basis of time of storage and importance of the information stored in the storage unit and used for the trouble analysis, and deletes the information in order from one with the lowest priority.

To achieve the abovementioned object, according to another aspect, referred to as Item 9, an information processing method reflecting one aspect of the present invention comprises: a control step of outputting, by an operation of a user, a diagnostic/recovery menu in which a processing detail of each of a plurality of diagnostic/recovery processing is associated with importance of the processing detail on a display unit of a user interface unit as well as determining a range and a type of information to be acquired for a trouble analysis on the basis of diagnostic/recovery processing selected by the user on the diagnostic/recovery menu and storing the determined information into a storage unit along with the importance.

Another aspect, referred to as Item 10, is the information processing method of Item 9, wherein the control step preferably updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

Another aspect, referred to as Item 11, is the information processing method of Item 9, wherein the control step preferably determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

Another aspect, referred to as Item 12, is the information processing method of Item 9, wherein the control step preferably compares a level of importance selected by the user this time with importance of previous diagnostic/recovery processing when the importance specified by the diagnostic/recovery processing selected by the user on the diagnostic/recovery menu is determined lower than a threshold on the basis of the importance, and, when the importance is higher than the previous time, updates trouble count information that counts the occurrence of a trouble and transmits information to an external management system.

Another aspect, referred to as Item 13, is the information processing method of Item 9, wherein the control step preferably compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

Another aspect, referred to as Item 14, is the information processing method of Item 9, wherein the control step preferably determines an operation of an input unit of the user interface unit to execute specific diagnostic/recovery processing upon determining that the diagnostic/recovery menu cannot be output on the display unit due to a problem with the user interface unit.

To achieve the abovementioned object, according to another aspect, referred to as Item 15, a non-transitory recording medium storing a computer readable program reflecting one aspect of the present invention causes a computer to execute: a control step of outputting, by an operation of a user, a diagnostic/recovery menu in which a processing detail of each of a plurality of diagnostic/recovery processing is associated with importance of the processing detail on a display unit of a user interface unit as well as determining a range and a type of information to be acquired for a trouble analysis on the basis of diagnostic/recovery processing selected by the user on the diagnostic/recovery menu and storing the determined information into a storage unit along with the importance.

Another aspect, referred to as Item 16, is the non-transitory recording medium storing a computer readable program of Item 15, wherein the control step preferably updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

Another aspect, referred to as Item 17, is the non-transitory recording medium storing a computer readable program of Item 15, wherein the control step preferably determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

Another aspect, referred to as Item 18, is the non-transitory recording medium storing a computer readable program of Item 15, wherein the control step preferably compares a level of importance selected by the user this time with importance of previous diagnostic/recovery processing when the importance specified by the diagnostic/recovery processing selected by the user on the diagnostic/recovery menu is determined lower than a threshold on the basis of the importance, and, when the importance is higher than the previous time, updates trouble count information that counts the occurrence of a trouble and transmits information to an external management system.

Another aspect, referred to as Item 19, is the non-transitory recording medium storing a computer readable program of Item 15, wherein the control step preferably compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

Another aspect, referred to as Item 20, is the non-transitory recording medium storing a computer readable program of Item 15, wherein the control step preferably determines an operation of an input unit of the user interface unit to execute specific diagnostic/recovery processing upon determining that the diagnostic/recovery menu cannot be output on the display unit due to a problem with the user interface unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION

Hereinafter, an embodiment of an information processing apparatus according to the present invention will be described with reference to the drawings. However, the scope of the invention is not limited to the illustrated examples. In the present embodiment, an image forming apparatus will be described as an example of the information processing apparatus.

Figure 1:
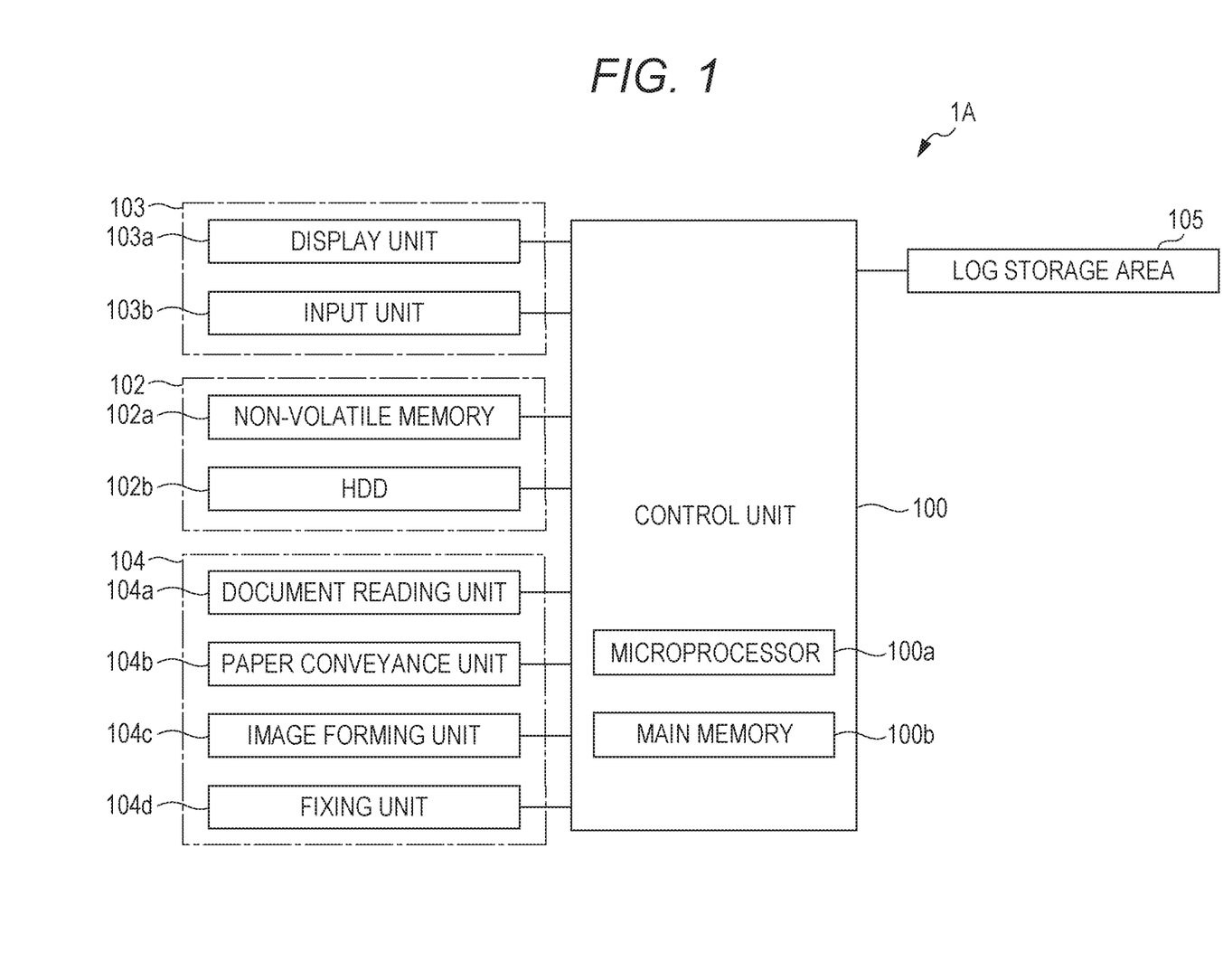
FIG. 1 is a block diagram illustrating an example of a functional configuration of an image forming apparatus according to an embodiment.
Figure 2:
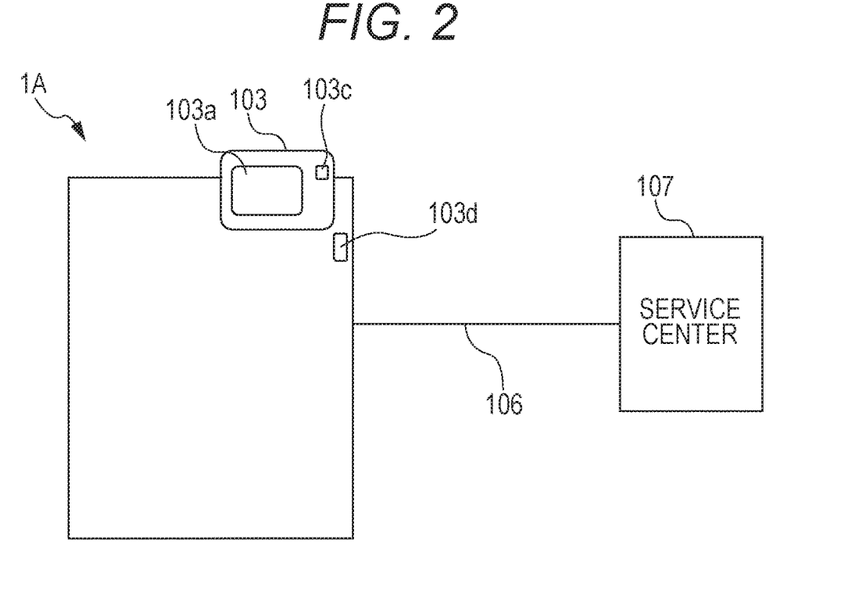
FIG. 2 is a block diagram illustrating an example of an information processing system incorporating the image forming apparatus according to the embodiment.

Example of Configuration of Image Forming Apparatus According to Present Embodiment FIG. 1 is a block diagram illustrating an example of a functional configuration of the image forming apparatus according to the present embodiment, and FIG. 2 is a block diagram illustrating an example of an information processing system incorporating the image forming apparatus of the present embodiment.

An image forming apparatus 1A of the present embodiment includes a control unit 100 performing a series of controls that feeds paper, forms an image and ejects the paper. The control unit 100 is an example of a control unit and includes a microprocessor 100a referred to as a CPU or an MPU and a main memory 100b such as a RAM, a ROM and the like as a storage unit. The control unit 100 performs control over a normal operation and a diagnostic/recovery function.

A storage 102 is an example of another storage unit and includes a non-volatile memory 102a, a hard disk drive (HDD) 102b and the like. The storage 102 stores a program operating the image forming apparatus 1A, a setting item, information input by a user and the like.

A user interface unit 103 is an example of an operation unit and includes a display unit 103a such as a flat panel display and an input unit 103b such as a touch panel and/or a button. The user interface unit 103 is used by a user to perform an operation during the normal operation, call the diagnostic/recovery function by pressing a diagnostic button, make a selection and the like.

A peripheral unit 104 is a unit implementing a function at the time of the normal operation. The image forming apparatus 1A includes, as the peripheral unit 104, a document reading unit 104a reading an image from a document, a paper conveyance unit 104b conveying paper, an image forming unit 104c forming a latent image by scanning exposure, developing the latent image with a toner and transferring the toner to the paper, and a fixing unit 104d fixing the toner to the paper, for example.

In a normal operation of forming an image on paper with the image forming apparatus 1A, the control unit 100 controls the paper conveyance unit 104b to convey paper. The control unit 100 controls the image forming unit 104c on the basis of image data acquired from a document by the document reading unit 104a or image data acquired from an external personal computer or the like (not shown), and forms an image on the paper. The control unit 100 further controls the fixing unit 104d to fix the image onto the paper and eject the paper on which the image is formed.

Second Embodiment

A log storage area 105 used in the diagnostic/recovery function is set to the image forming apparatus 1A. The log storage area 105 stores in real time a history of operation performed by the user during the normal operation, a state of a job being processed, an internal state of the control unit 100 and the like. Note that the real-time storage includes an operation of storing performed every predetermined time. The log storage area 105 has battery backup in order for the memory to not be erased by turning off and on a power supply in a short period of time such as when turning on the power supply for the second time.

The log storage area 105 may instead be an independent storage formed of a semiconductor memory or the like. Alternatively, a part of the area in the non-volatile memory 102a or the HDD 102b may be used for the log storage area 105. Moreover, the main memory 100b may be backed up by a capacitor unit such as a battery or a capacitor not shown to artificially make the log storage area 105 non-volatile. Alternatively, it may be adapted to set the log storage area 105 in the main memory 100b while at the same time monitoring a state of the power supply and copying the content of the log storage area 105 to the non-volatile memory 102a upon detecting a voltage drop to artificially make the log storage area 105 non-volatile.

The image forming apparatus 1A includes a diagnostic button 103c as the user interface unit 103. The image forming apparatus 1A performs an operation guidance that causes a user to operate the diagnostic button 103c when he experiences a trouble. Once the user experiencing the trouble operates the diagnostic button 103c, the control unit 100 executes a diagnostic/recovery menu. When the diagnostic button 103c is shared among a plurality of functions for selection such as when another function is assigned to the button, the control unit executes the diagnostic/recovery menu upon determining that the button is pressed and held down, for example.

Moreover, when one cannot enter the diagnostic/recovery menu from the user interface unit 103 because of hang-up or display not being recognized, he can turn off a power switch 103d and then turn it back on while pressing the diagnostic button to be able to enter the diagnostic/recovery menu.

Example of Operation of Image Forming Apparatus According to Present Embodiment

Figure 3:
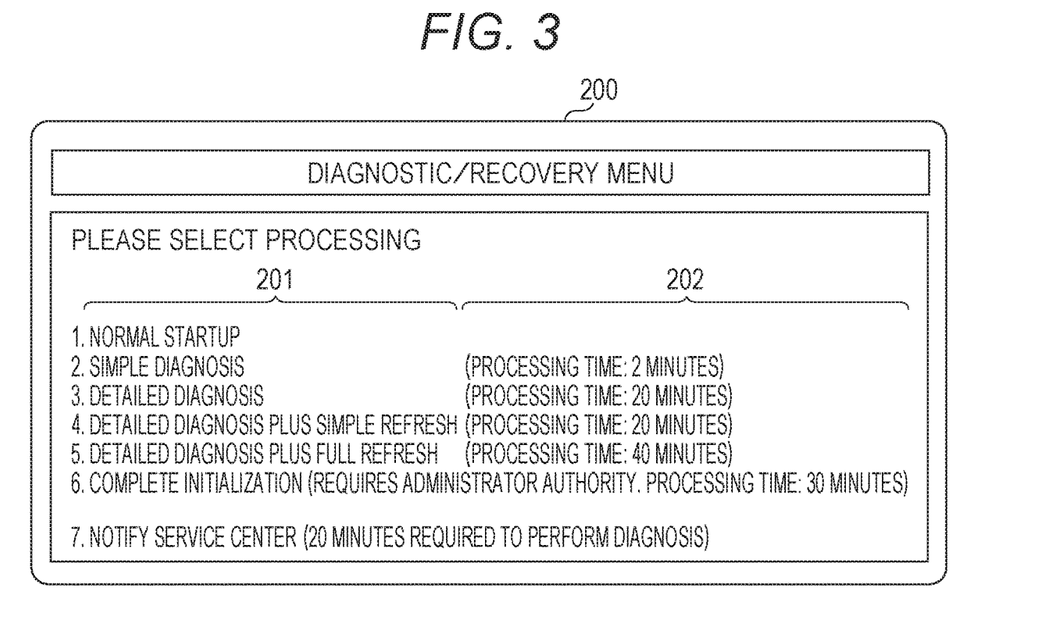
FIG. 3 is a diagram illustrating an example of a diagnostic/recovery menu of the image forming apparatus according to the embodiment.

FIG. 3 is a diagram illustrating an example of the diagnostic/recovery menu of the image forming apparatus according to the present embodiment, and there will be described the diagnostic/recovery processing of the image forming apparatus according to the present embodiment with reference to the drawings.

When the user performs an operation to call the diagnostic/recovery processing by pressing the diagnostic button 103c or the like, the control unit 100 displays a diagnostic/recovery menu 200 illustrated in FIG. 3 on the display unit 103a of the user interface unit 103. The diagnostic/recovery menu 200 displays diagnosis menu information 201 and processing time information 202 indicating a rough estimate of time required.

When the user experiences a trouble with the operation in the image forming apparatus 1A, he can perform an operation to call the diagnostic/recovery menu 200 and attempt the diagnostic processing and recovery processing. The diagnostic/recovery menu 200 presents the type of the diagnostic/recovery processing and the rough estimate of the time required for the processing to the user, who can then select the diagnostic/recovery processing by referring to the rough estimate of the time required.

The control unit 100 determines importance of the diagnostic/recovery processing selected by the user on the basis of the rough estimate of the time required that is specified in the processing time information 202, and determines the range and type of history information to be acquired for a trouble analysis on the basis of the importance of the diagnostic/recovery processing, the history information including an operation history, an operation log, an internal state log and the like.

The control unit 100 then acquires the history information and stores the information in the storage 102 according to the diagnostic/recovery processing selected by the user on the diagnostic/recovery menu 200.

The rough estimate of the time required that is specified in the processing time information 202 may be determined in advance or vary according to the state of the image forming apparatus 1A. Note that there is selected a processing menu, the time required for which differs in each choice, since the importance of the diagnostic/recovery processing is determined on the basis of the rough estimate of the time required.

Accordingly, in the image forming apparatus 1A, the user can select the diagnostic processing and recovery processing at his choice according to the time required for the processing by referring to the diagnostic/recovery menu 200. The control unit 100 then executes the diagnostic processing and recovery processing selected by the user.

When a simple diagnosis is selected as the diagnostic processing, the control unit 100 acquires a simple log from which information requiring a long time to be acquired is omitted, the information being stored in the memory dump or an external storage not shown. On the other hand, the control unit 100 acquires all logs when a detailed diagnosis is selected as the diagnostic processing.

One can also select to receive support by notifying a service center 107 that is an external management system connected via a network 106, in which case a log is acquired when the diagnostic processing is not executed recently, and then there is added the time required for notifying the service center after the diagnostic processing is executed.

An item to be executed in the diagnostic processing and recovery processing that can be selected on the diagnostic/recovery menu 200 includes the following, for example. That is, what is executed as the diagnostic processing includes a self diagnosis of hardware, a diagnosis of communication with a peripheral unit, a diagnosis of capacity, inconsistency, and failure of an external storage, a diagnosis of inconsistency in a set value and data corruption, and a determination on a discrepancy in the log information.

What is executed as the recovery processing includes partial refresh, backup/initialization/check and restoration of only the set value, backup/initialization/check and restoration of user information of the external storage, and complete initialization.

Figure 4:
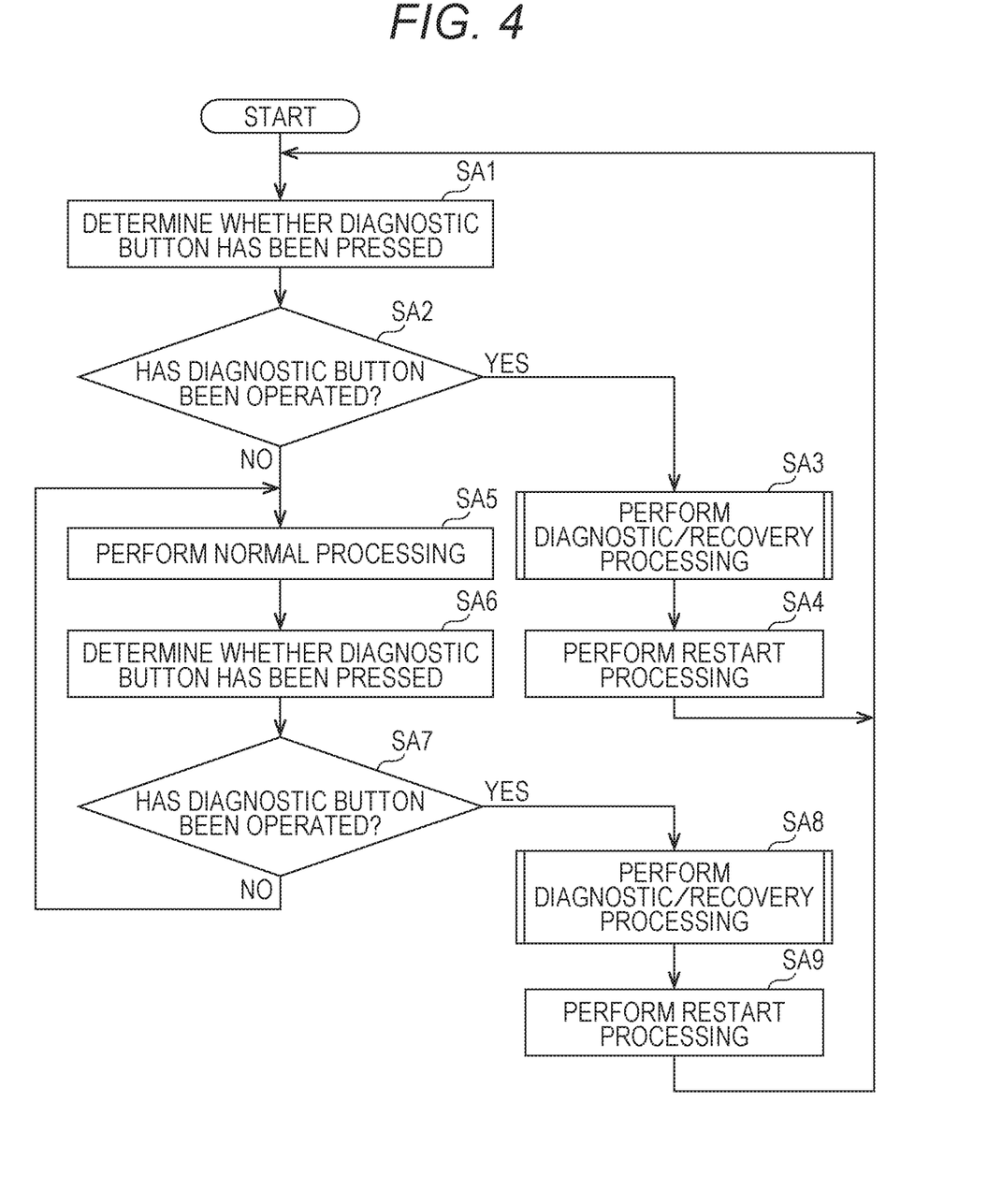
FIG. 4 is a flowchart illustrating an example of an operation of starting diagnostic/recovery processing.

FIG. 4 is a flowchart illustrating an example of an operation of starting the diagnostic/recovery processing. The control unit 100 performs minimal initialization allowing for the use of only the user interface unit 103 in order to not erase as much as possible the content in the main memory 100b used in normal processing until just before starting the diagnostic processing and recovery processing, and determines whether or not the diagnostic button 103c is pressed in step SA1 of FIG. 4.

Upon determining in step SA2 of FIG. 4 that the diagnostic button 103c is pressed, the control unit 100 starts the diagnostic/recovery processing in step SA3 and performs restart processing in step SA4 after completing the diagnostic/recovery processing. The content in the main memory 100b is not erased in order to acquire the information left in the main memory 100b at the time of memory dump.

The control unit 100 starts the normal processing in step SA5 of FIG. 4 when determining in step SA2 of FIG. 4 that the diagnostic button 103c is not pressed or that cancellation is selected in the diagnostic/recovery menu.

The control unit 100 also determines whether or not the diagnostic button 103c is pressed in step SA6 of FIG. 4 while the normal processing is executed. Upon determining in step SA7 of FIG. 4 that the diagnostic button 103c is pressed, the control unit 100 starts the diagnostic/recovery processing in step SA8 and performs the restart processing in step SA9 after completing the diagnostic/recovery processing.

Figure 5:
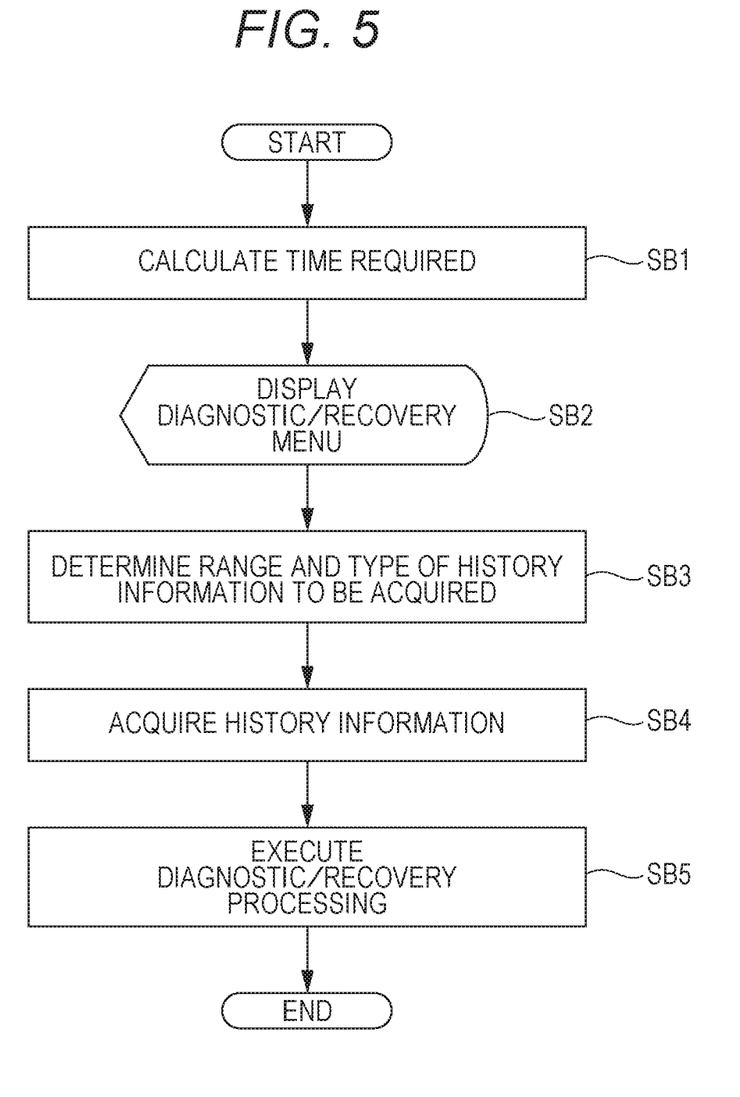
FIG. 5 is a flowchart illustrating an example of the diagnostic/recovery processing.

FIG. 5 is a flowchart illustrating an example of the diagnostic/recovery processing. In step SB1 of FIG. 5, the control unit 100 calculates for each diagnosis menu information 201 the rough estimate of the time required in executing the processing set in the diagnosis menu information 201 on the basis thereof set on the diagnostic/recovery menu 200 illustrated in FIG. 3. Note that a predetermined value corresponding to each diagnosis menu information 201 may be used as the rough estimate of the time required.

When the user performs the operation to call the diagnostic/recovery processing by pressing the diagnostic button 103c or the like, the control unit 100 in step SB2 of FIG. 5 displays the diagnostic/recovery menu 200 illustrated in FIG. 3 on the display unit 103a of the user interface unit 103. The diagnostic/recovery menu 200 displays the diagnosis menu information 201 and the processing time information 202 indicating the rough estimate of the time required.

When the user refers to the diagnostic/recovery menu 200 output by the user interface unit 103 and selects the diagnostic processing and recovery processing according to the time required for the processing, the control unit 100 in step SB3 of FIG. 5 determines the importance of the diagnostic/recovery processing on the basis of the rough estimate of the time required that is specified in the processing time information 202. The control unit then determines the range and type of the history information to be acquired for the trouble analysis on the basis of the importance of the diagnostic/recovery processing, the information including the operation history, the operation log, the internal state log and the like.

After determining the range and type of the history information to be acquired, the control unit 100 acquires the history information of the determined range and type in step SB4 of FIG. 5 and executes the diagnostic processing and recovery processing in step SB5.

When the user selects diagnostic processing more advanced than the detailed diagnosis on the diagnostic/recovery menu 200, the control unit 100 acquires a detailed log including the memory dump as well as updates trouble count information that counts the occurrence of a significant trouble and then notifies the service center 107. After that, the diagnostic processing and recovery processing are executed according to the selection of the user on the diagnostic/recovery menu 200.

The detailed log is not acquired in a related art when no abnormality is detected in a job. The service center 107 is not notified, either. In the present embodiment, on the other hand, the detailed log is acquired regardless of whether or not the occurrence of the abnormality is detected in the recent job when the user experiences some kind of trouble, determines that the trouble is severe, and selects the diagnostic/recovery processing of high importance. Moreover, the trouble count information that counts the occurrence of a significant trouble is updated, recorded, and notified to the external service center 107.

As a result, when the user experiences a trouble, the log is acquired according to the degree of the trouble experienced by the user while at the same time a frequency at which the user experiences the trouble is recorded, so that the trouble can be addressed smoothly by investigating the cause or the like and that time required to solve the trouble can be cut down.

Upon executing the diagnostic processing and recovery processing, the control unit 100 updates diagnostic/recovery processing count information that counts the number of times the diagnostic/recovery processing is executed while at the same time adding up the time required for the recovery processing and updating recovery processing time information.

Even in a case where the diagnostic/recovery processing selected by the user on the diagnostic/recovery menu 200 is of low importance, the control unit 100 acquires the detailed log including the memory dump as well as updates the trouble count information and thereafter notifies the service center 107 when the diagnostic/recovery processing specified in the diagnostic/recovery processing count information is executed many times to cause an integrated value of the recovery processing time within a predetermined period to exceed a threshold.

The log is acquired even when the degree of a trouble is light in the case where the user experiences the trouble repeatedly to cause execution of the diagnostic/recovery processing, so that the trouble can be addressed smoothly by investigating the cause or the like and that time required to solve the trouble can be cut down.

Moreover, when the user experiences a trouble repeatedly to cause execution of the diagnostic/recovery processing successively in a short period of time, the control unit 100 compares the importance selected by the user in the previous diagnostic/recovery processing with the importance selected by the user in the current diagnostic/recovery processing. When determining that the importance selected by the user in the current diagnostic/recovery processing is higher than that of the previous processing, the control unit 100 acquires the detailed log including the memory dump as well as updates the trouble count information and thereafter notifies the service center 107 even when an integrated value of the recovery processing time within a predetermined period does not exceed a threshold.

Moreover, when determining that the importance selected by the user in the current diagnostic/recovery processing is higher than that of the previous processing, the control unit 100 expands the range of the history information to be acquired by acquiring the detailed log including the memory dump or the like even when the importance is low such as when the simple diagnosis is selected by the user. The control unit also updates the trouble count information and notifies the service center 107.

Note that it may be adapted to enable a shift to the diagnostic/recovery processing by the input unit 103b alone even when the user cannot make a selection by using the display unit 103a such as when the user interface unit 103 fails or has destroyed display language data.

A signal accompanying an operation can be output by, for example, adopting a mechanical button instead of the touch panel as the diagnostic button 103c of the input unit 103b even when the display unit 103a is unusable.

As a result, the control unit 100 shifts to the diagnostic/recovery processing upon detecting a predetermined operation such as holding down of the diagnostic button 103c. Note however that the control unit is adapted to be able to shift to one predetermined diagnostic/recovery processing when a selection cannot be made while referring to the information displayed on the display unit 103a.

The control unit stands by for a certain period of time determined in advance upon detecting execution of a predetermined operation such as holding down of the diagnostic button 103c, for example. When no operation is performed after standing by for the certain period of time, the control unit executes the diagnostic/recovery processing at the highest importance level such as acquisition of the detailed log including the memory dump.

As a result, even when the user cannot make a selection by using the display unit 103a such as when the user interface unit 103 fails or has the destroyed display language data, a predetermined operation not using the display unit 103a enables the shift to the diagnostic/recovery processing to be able to prevent the occurrence of a problem such as the history information not being acquired.

In a related art, the operation of initialization and log acquisition for the recovery processing requires authority of an administrator and a service person and thus cannot be executed by a general user. In the present embodiment, on the other hand, the control unit 100 allows for a selection of diagnostic/recovery processing on the diagnostic/recovery menu 200, the processing being adapted to restore the set value after initializing various settings and the storage area to restore the setting to one before execution of the processing. As a result, the user by himself not having the administrator authority can attempt the recovery processing involving initialization. Note that authentication of the administrator authority is required when the complete initialization is selected.

The history information such as the detailed log including the memory dump is stored in the non-volatile memory 102a or the HDD 102b of the storage 102, for example. A plurality of pieces of the history information can be stored in the storage 102 while taking into account the upper limit of the storage capacity of the storage 102.

Note that when the stored information reaches the upper limit of the storage capacity allocated to the log storage area 105 or approaches the upper limit of the storage capacity within a predetermined range, the history information of the diagnostic/recovery processing is deleted in order from one that is of low importance and old while preferentially keeping one that is of high importance and new among the diagnostic/recovery processing selected on the diagnostic/recovery menu 200.

When the storage capacity allocated to the log storage area 105 is insufficient, for example, the storage capacity is secured by deleting the simple log starting with the oldest one. When the storage capacity is still insufficient after deleting the simple log, the storage capacity is secured by deleting the detailed log starting with the oldest one. As a result, the information of higher importance among the history information can be kept preferentially.

The present invention is applicable to an information processing apparatus equipped with a user interface unit.

According to an embodiment of the present invention, the history information associated with the trouble and corresponding to the degree of the trouble experienced by the user is stored so that the information required for trouble analysis and resolution is already acquired at the time of notifying a support center and making an inquiry. The trouble can thus be addressed smoothly by investigating the cause or the like to be able to cut down the time required for the resolution.

Moreover, from among the plurality of the diagnostic/recovery processing prepared, the diagnostic/recovery processing selected by the will of the user according to the importance of the trouble can be executed, whereby the processing time can be selected to make it easier for him to estimate in advance a period during which the apparatus cannot be used.

Although the present invention has been described and illustrated in detail, it is clearly understood that the same is by way of illustrated and example only and is not to be taken by way of limitation, the scope of the present invention being interpreted by terms of the appended claims.

In First to Sixth Experiment Examples in which a temperature of a mold die was lower than a glass heating temperature, an optical element having an excellent surface accuracy, surface roughness, and transmittance was obtained. Meanwhile, in Seventh Experiment Example in which the glass heating temperature was the same as the temperature of a mold die, fusion occurred, and a surface accuracy could not be evaluated.

In the above description, the present invention has been described with reference to the embodiments, but the present invention is not limited to the above embodiments, but various modifications can be performed. For example, the composition of chalcogenide glass is not limited to those exemplified above, but a method similar to the above method can be applied to chalcogenide glass having various compositions.

In the above embodiments, an optical element other than the lens LE can be obtained by adapting the shape of each of the transfer surfaces 15a and 16a to a purpose.

In the above embodiments, the infrared ray irradiation unit 32 is not limited to a combination of the infrared lamp 32a and the mirror 32b, but various light sources capable of local irradiation with heating light such as an infrared ray can be used.

What is claimed is:

1. An information processing apparatus comprising:
a user interface unit including a display unit and an input unit; and
a processor
outputting, by an operation of a user, a diagnostic/recovery menu on the display unit, in which a processing detail of each of a plurality of diagnostic/recovery processing is associated with an importance based on a processing time estimate,
determining a time range to acquire a type of history information, and acquiring the type of history information for the time range,
wherein the time range and the type of history information are to be utilized in a trouble analysis,
wherein the time range and the type of history information are based on at least one of: (i) an importance of the processing detail for a diagnostic/recovery processing, the diagnostic/recovery processing having been selected by the user on the diagnostic/recovery menu, (ii) a degree of trouble experienced by the user, and (iii) a frequency at which the trouble has been experienced, and
wherein one type of history information includes operation history information, and
storing the determined information into a storage unit along with the importance.

2. The information processing apparatus according to claim 1, wherein
the processor updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

3. The information processing apparatus according to claim 1, wherein
the processor determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

4. The information processing apparatus according to claim 1, wherein
the processor compares a level of importance selected by the user this time with importance of previous diagnostic/recovery processing when the importance specified by the diagnostic/recovery processing selected by the user on the diagnostic/recovery menu is determined lower than a threshold on the basis of the importance, and, when the importance is higher than the previous time, updates trouble count information that counts the occurrence of a trouble and transmits information to an external management system.

5. The information processing apparatus according to claim 1, wherein
the processor compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

6. The information processing apparatus according to claim 1, wherein
the processor determines an operation of the input unit to execute specific diagnostic/recovery processing upon determining that the diagnostic/recovery menu cannot be output on the display unit due to a problem with the user interface unit.

7. The information processing apparatus according to claim 1, wherein
the processor allows for selection of diagnostic/recovery processing that executes initialization and restoration after the initialization on the diagnostic/recovery menu.

8. The information processing apparatus according to claim 1, wherein
the processor determines priority of information that is kept stored on the basis of time of storage and importance of the information stored in the storage unit and used for the trouble analysis, and deletes the information in order from one with the lowest priority.

9. An information processing method comprising:
a control step of outputting, by an operation of a user, a diagnostic/recovery menu on a display unit of a user interface in which a processing detail of each of a plurality of diagnostic/recovery processing is associated with an importance based on a processing time estimate,
determining a time range to acquire a type of history information, and acquiring the type of history information for the time range,
wherein the time range and the type of history information are to be utilized in a trouble analysis,
wherein the time range and the type of history information are based on at least one of: (i) importance of the processing detail for a diagnostic/recovery processing, the diagnostic/recovery processing having been selected by the user on the diagnostic/recovery menu, iii) a degree of trouble experienced by the user, and (iii) a frequency at which the trouble has been experienced, and
wherein one type of history information includes operation history information, and storing the determined information into a storage unit along with the importance.

10. The information processing method according to claim 9, wherein
the control step updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

11. The information processing method according to claim 9, wherein
the control step determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

12. The information processing method according to claim 9, wherein
the control step compares a level of importance selected by the user this time with importance of previous diagnostic/recovery processing when the importance specified by the diagnostic/recovery processing selected by the user on the diagnostic/recovery menu is determined lower than a threshold on the basis of the importance, and, when the importance is higher than the previous time, updates trouble count information that counts the occurrence of a trouble and transmits information to an external management system.

13. The information processing method according to claim 9, wherein
the control step compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

14. The information processing method according to claim 9, wherein
the control step determines an operation of an input unit of the user interface unit to execute specific diagnostic/recovery processing upon determining that the diagnostic/recovery menu cannot be output on the display unit due to a problem with the user interface unit.

15. A non-transitory recording medium storing a computer readable program that causes a computer to execute:
a control step of outputting, by an operation of a user, a diagnostic/recovery menu on a display unit of a user interface in which a processing detail of each of a plurality of diagnostic/recovery processing is associated with an importance based on a processing time estimate, determining a time range to acquire a type of history information, and acquiring the type of history information for the time range,
wherein the time range and the type of history information are to be utilized in a trouble analysis for a diagnostic/recovery processing, wherein the time range and the type of history information are based on at least one of: (i) an importance of the processing detail for a diagnostic/recovery processing, the diagnostic/recovery processing having been selected by the user on the diagnostic/recovery menu, (ii) a degree of trouble experienced by the user, and (iii) a frequency at which the trouble has been experienced, and wherein one type of history information includes operation history information, and storing the determined information into a storage unit along with the importance.

16. The non-transitory recording medium storing a computer readable program according to claim 15, wherein
the control step updates trouble count information that counts the occurrence of a trouble and transmits information to an external management system when importance specified by the diagnostic/recovery processing is determined higher than a threshold on the basis of the importance, the diagnostic/recovery processing being selected by the user on the diagnostic/recovery menu.

17. The non-transitory recording medium storing a computer readable program according to claim 15, wherein
the control step determines an integrated value of processing time from the number of times the diagnostic/recovery processing is executed when importance specified by the diagnostic/recovery processing selected by the user on the diagnostic/recovery menu is determined lower than a threshold on the basis of the importance, and, when the integrated value of the processing time is longer than a threshold, updates trouble count information that counts the occurrence of a trouble and transmits information to an external management system.

18. The non-transitory recording medium storing a computer readable program according to claim 15, wherein
the control step compares a level of importance selected by the user this time with importance of previous diagnostic/recovery processing when the importance specified by the diagnostic/recovery processing selected by the user on the diagnostic/recovery menu is determined lower than a threshold on the basis of the importance, and, when the importance is higher than the previous time, updates trouble count information that counts the occurrence of a trouble and transmits information to an external management system.

19. The non-transitory recording medium storing a computer readable program according to claim 15, wherein
the control step compares, after the diagnostic/recovery processing is executed successively, a level of importance selected by the user this time with importance of previous diagnostic/recovery processing on the basis of the importance specified by the diagnostic/recovery processing selected by the user on the diagnostic/recovery menu, and, when the importance is higher than the previous time, increases the range and type of the information to be acquired for the trouble analysis.

20. The non-transitory recording medium storing a computer readable program according to claim 15, wherein
the control step determines an operation of an input unit of the user interface unit to execute specific diagnostic/recovery processing upon determining that the diagnostic/recovery menu cannot be output on the display unit due to a problem with the user interface unit.

* * * * *